United States Patent [19]

Flusche et al.

[11] 4,293,910
[45] Oct. 6, 1981

[54] RECONFIGURABLE KEY-IN-STORAGE MEANS FOR PROTECTING INTERLEAVED MAIN STORAGE

[75] Inventors: Frederick O. Flusche, Hyde Park; Kwang G. Tan, Poughkeepsie; Ralph W. Wright, Pleasant Valley, all of N.Y.

[73] Assignee: International Business Machines Corporation, Armonk, N.Y.

[21] Appl. No.: 54,350

[22] Filed: Jul. 2, 1979

[51] Int. Cl.³ .................... G11C 7/00; G08B 29/00
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,576,544 | 4/1971 | Cordero, Jr. et al. | 364/200 |
| 3,742,460 | 6/1973 | Englund | 364/900 |
| 3,761,883 | 9/1973 | Alvarez et al. | 364/200 |
| 3,765,001 | 10/1973 | Beausoleil | 364/200 |
| 3,813,652 | 5/1974 | Elmer et al. | 364/200 |
| 3,825,903 | 7/1974 | Brown | 364/200 |
| 3,983,537 | 9/1976 | Parsons et al. | 364/200 |
| 4,037,215 | 7/1977 | Birney et al. | 364/200 |
| 4,051,551 | 9/1977 | Lawrie et al. | 364/200 |
| 4,093,985 | 6/1978 | Das | 364/200 |
| 4,136,386 | 1/1979 | Annunziata et al. | 364/200 |

Primary Examiner—Gareth D. Shaw
Assistant Examiner—Eddie P. Chan
Attorney, Agent, or Firm—Bernard M. Goldman

[57] ABSTRACT

The disclosure provides a storage protection (SP) array in each of two system controllers (SCs) in a multiprocessing system which has a shared main storage containing a plurality of basic storage modules (BSMs). The BSMs may be operated with block and page interleaved addresses. Each block in main storage is assigned a key-in-storage having an entry in one of the two arrays.

A cross-interrogate (XI) bus connects between the SCs. Using the XI bus, each processor request is sent to an SP address register in every SP array.

Each array is divided into a plurality of equal groups. Each group has a range identifier register and a comparator. The range identifier register is loaded with a value which controls the range of main storage addresses to which the group is assigned. All of the comparators in each array are connected to a high-order part of the SP address register for the array.

The range identifier registers in all of the groups in both arrays are assigned different values which cover the entire address range of main storage, and only one array need contain a particular key-in-storage. A BSM bit and a page bit in the processor request address are put into the high-order field of the SP address register to control the selection of a group, so that alternate pages have their keys-in-storage put in different groups in a pair of groups in a SP array.

Key-in-storage accesses may be overlapped between different groups in an array.

When a request received from the XI bus has its key-in-storage found in one array, the key-in-storage is transmitted on the XI bus to the SC which sent the request.

6 Claims, 6 Drawing Figures

RECONFIGURABLE KEY-IN-STORAGE MEANS FOR PROTECTING INTERLEAVED MAIN STORAGE

INTRODUCTION

This invention relates to controls for storage arrays containing the "key-in-storage" bytes used for preventing an unauthorized modification or access to data and for providing information about accesses to blocks in the main storage of a data processing system.

BACKGROUND

The IBM System/370 "Principles of Operation" (Form No. 22-7000-4), page 38, defines the key-in-storage architecture which associates a key-in-storage byte with each 2048 byte (i.e. 2K) block in real main storage. The key-in-storage byte includes a four bit access control key, a fetch control bit F, a reference bit R, and a change bit C. An executing program is only permitted to access data in main storage when the program has in its program status word (PSW) the key assigned to the block to be accessed for the requested data, or if the program has a key equal to zero which is a master key that can access any block in storage and is generally used by the system control programs. If the fetch-protection bit F is set, the associated block is not to be fetched or stored without a key match or zero key. The reference bit R is set whenever a fetch or store access is made to the block, and the change bit C is set whenever the block is stored into. Special instructions are provided for setting and resetting values into these different fields in the key-in-storage byte.

PRIOR ART

Keys-in-storage of the type controlled by this invention have been in commercial use for many years, such as in the IBM System/360 and System/370 types of data processing systems. For example, the IBM System/370 M168 and 3033 systems store all key-in-storage bytes in a key array which controls accesses directly to main storage. Fetch requests cause keys to be copied into a DLAT entry from which the keys are used in relation to cache accesses.

U.S. Pat. No. 3,761,883 discloses a control for handling copies of storage protection keys in the directory of a processor's high speed buffer.

U.S. Pat. No. 3,825,903 provides one or more separate registers for receiving copies of storage keys at respective programming levels to permit each subsequent instruction in a system control program to access a storage area being used by the prior program which was interrupted. U.S. Pat. No. 3,576,544 puts storage keys into a local store for use by I/O channel transfers to main storage.

SUMMARY OF THE INVENTION

The subject invention provides a unique arrangement and controls for key-in-storage arrays to make them easily reconfigurable either when system main storage is reconfigured or independently of main storage reconfigurations.

Furthermore, the invention enables the separate location of each of plural key-in-storage arrays in different storage controllers, wherein each array may contain only a part of the keys-in-storage for main storage; and a processor request to one storage controller can use the arrays in all storage controllers for a total key check of main storage.

This invention organizes its key-in-storage arrays in relation to a particular type of main storage physical address assignment conceived to aid subsequent main storage reconfiguration. The key-in-storage arrays are organized in relation to the assignment of ranges of absolute addresses to different parts of physical main storage and to block interleaving address assignments among such ranges of absolute addresses. When parts of such a main storage arrangement are subsequently reassigned to different sets of absolute addresses due to a reconfiguration of main storage, inefficiencies may occur in conventional types of key-in-storage arrays that may leave a large part of the arrays unused and result in an increase in the size and/or number of arrays needed to handle the reconfigured situation.

It is an object of this invention to provide a reconfigurable key-in-storage array control system which may reconfigure the key-in-storage array independently of reconfigurations of main storage, such as when a failure occurs to any part of the key-in-storage array.

It is another object of this invention to provide a key-in-storage array control system which enables the efficient relocation of key-in-storage entries in a key-in-storage array when main storage is reconfigured.

It is a more specific object of this invention to divide a key-in-storage array into storage protect (SP) groups that enable reassignment of SP array groups to ranges of absolute addresses, while any basic storage modules (BSM's) may be reconfigured in main storage for corresponding ranges of absolute addresses using block interleaving of the BSMs.

It is a further object of this invention to assign any SP group in a key-in-storage array to an absolute address range by inserting a set of bits equal to the high order bits of the assigned address range into a range identifier register with each SP group.

It is still another object of the invention to provide hardware that enables the reassignment of the key-in-storage entries in any SP group to a different absolute address range by resetting the bits in a range identifier register to the high order bits of the different address range and loading the key in storage entries. A bad SP group can thereby be reassigned out of use and replaced by another SP group, after which normal system operation may continue, and the bad SP group can be repaired at any later time during scheduled system maintenance.

It is another object of this invention, when using even-odd page interleaving among two pairs of BSMs where each pair of BSMs has only even or odd pages (but not both), to obtain increased efficiency within a key-in-storage array by using a different manner of page address interleaving among SP groups of the array. This is done by generating an SP group address to locate the SP group having the required key-in-storage entry by using bits from the request's absolute address in a different sequence in the SP group address, in order to obtain page interleaving between a pair of SP groups on even-odd page boundaries. VARY commands may be used to reconfigure the main storage when eliminating or adding a pair of BSMs. Then the reassignment of SP groups during reconfiguration may be done under console control without requiring an initial microprogram load (IML) to change range values in range identifier registers in the key-in-storage array.

It is a further object of the invention to provide a different key-in-storage (KIS) array in each of plural separate system controllers (SCs), in which each KIS array services a different part of shared main storage, and the entire main storage is serviced by all of the KIS arrays.

These and other objects, features and advantages of the invention may be more fully understood and appreciated by considering the following detailed description in association with the accompanying drawings.

BRIEF DESCRIPTION OF THE DRAWINGS

In the accompanying drawings forming a material part of this disclosure.

GENERAL DESCRIPTION

Figure 2:
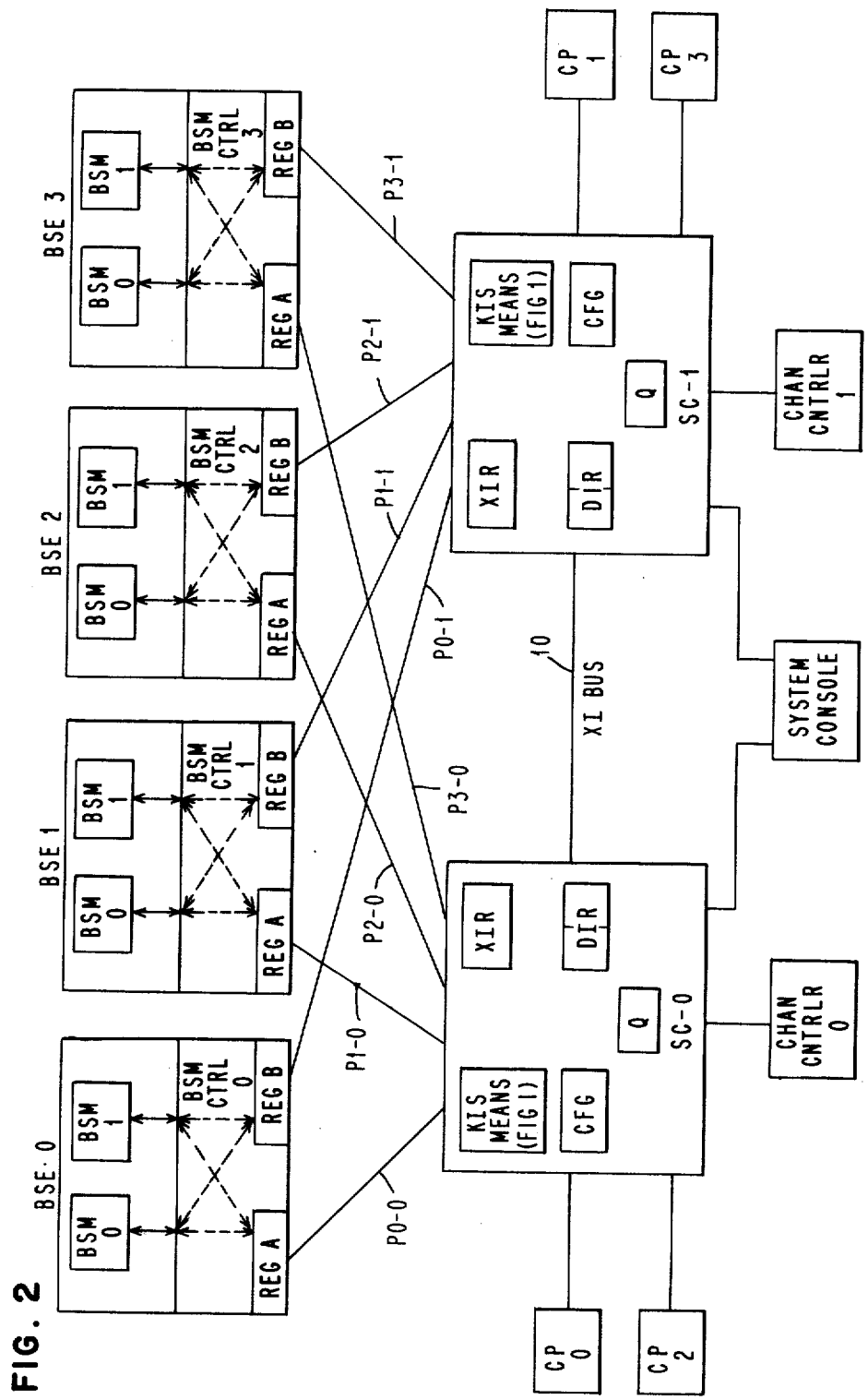
FIG. 2 represents a multiprocessor system within which the embodiment in FIGS. 1A and 1B is used.

In FIG. 2, the reconfigurable key-in-storage (KIS) means provided by this invention is provided in each system controller (SC) to control accesses into the main storage of a data processing system. The main storage of the system is comprised of basic storage elements (BSEs) 0, 1, 2 and 3. Each BSE is comprised of a pair of basic storage modules (BSMs) 0 and 1. Each BSM may contain 4 megabytes (MB) of storage.

Accesses to main storage may be made by any central processor, CP0, 1, 2, or 3, by any channel controller 0 or 1, and by a service and maintenance processor in the system console. Storage requests from the subset of SC-0 processors: CP0, CP2, channel controller 0, and the console processor are handled by system controller 0 (SC-0). Storage requests by the other subset of SC-1 processors: CP1, CP3, channel controller 1, and the console processor are handled by SC-1. Either SC is referred to as local to its subset of processors. Then the other SC is referred to as the remote SC. Both SCs operate in regard to the same storage request at a time, in order to synchronize their operation. This permits a request from any processor, local or remote, to be checked by both SCs for directory conflict and for key-in-storage.

Each BSE, SC, and CPs and channel controller in that SCs subset may be connected to a separate power source, permitting shut down for maintenance of any set of items connected to one power source, while items connected to another power source may remain operational in the system.

Each storage request is sent by a processor to its local SC in the form of an absolute address as that term is defined in the IBM System/370 Principles of Operation (previously cited). Each request is put into a cross-interrogate register (XIR) from which the request is sent to the remote SC. Each received local and remote request is checked against copies of cache directories (DIR) for each local CP contained in both SC-0 and SC-1 to determine synonym entries, keys, security flags, and to invalidate any entry to the same absolute address in any of the other directories for the other processors. Thus, DIR in SC-0 has copies of the directories for the caches in CP0 and CP2, while DIR in SC-1 has copies of the directories for the caches in CP1 and CP3. Thus, each request is sent by a XIR to the DIR and KIS means in both SC-0 and SC-1 so that each request can be checked against all four directories for the four CPs and the KIS means in both SC-0 and SC-1. Each storage request accepted by an SC is put into a queue (Q) of requests in the local SC to await being given priority to initiate cross-interrogation with the accompanying checking of the request against all directories and the KIS means, while the storage request is sent to main storage. The queues (Q), directories (DIR) and cross-interrogate (XIR) register operations are described and claimed in prior issued U.S. Pat. No. 4,136,386; Filed Oct. 6, 1977; Issued: Jan. 23, 1979; entitled "Backing Store Access Coordination In A Multiprocessor System" by E. J. Annunziata et al and assigned to the same assignee as the subject application.

The absolute address assignments for the BSMs in BSEs 0, 1, 2 and 3 are controlled by a memory configuration control CFG seen in FIG. 2 within each SC. CFG controls the translation of absolute addresses of local requests to physical BSM locations to accommodate address interleaving, relocation and access control. CFG is described and claimed in prior U.S. application Ser. No. 973,466; Filed: Dec. 26, 1978; entitled "Memory Configuration, Address Interleaving, Relocation and Access Control System" by K. G. Tan and assigned to the same assignee as the subject application. Each storage request received by an SC address is translated into a physical address by CFG by its selection of a port P0-P3 to the corresponding BSE, a BSM within the port, and a physical address in the selected BSM to a line of data (e.g. 16 double words) which is to be fetched or stored in the selected BSM.

The normal operation of main storage involves having the CFG in SC-0 and in SC-1 control 2KB (2 kilobyte) block interleaving among the BSMs, as opposed to the double word interleaving done by most of the current large commercial data processing systems. TABLE 1 represents an assignment of absolute addresses from 0 to 16MB (megabytes) for the four BSMs in BSE0 and BSE1. In this regard, TABLE 1 illustrates how the sequence of 2KB blocks (BL) sequentially map into the four different BSMs (BSM0 in BSE0, BSM1 in BSE0, BSM0 in BSE1, and BSM1 in BSE1):

TABLE 1

| BSE0 | | | | BSE1 | | | |
|---|---|---|---|---|---|---|---|
| BSM0 | | | BSM1 | BSM0 | | | BSM1 |
| BL0 | ← | (P0) | → BL1 | BL2 | ← | (P1) | → BL3 |
| BL4 | ← | (P2) | → BL5 | BL6 | ← | (P3) | → BL7 |

TABLE 1-continued

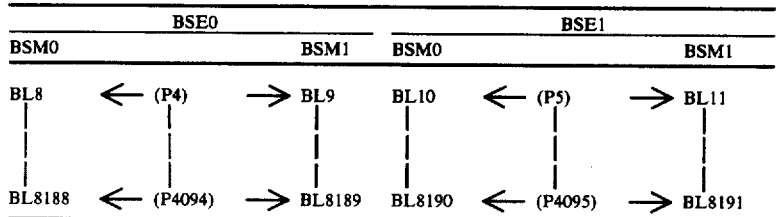

Also, in TABLE 1, each two sequential even and odd blocks form a 4KB page (P) with the indicated relationship to a pair of 2KB blocks (BL). Each page comprises a set of 4096 bytes (4KB) in storage on 4KB address boundaries. For example, in TABLE 1, blocks BL0 and BL1 comprise even-numbered page P0, blocks BL2 and BL3 comprise odd-numbered page P1, etc.

It will therefore be noted that the manner of block interleaving in TABLE 1 causes BSE0 to have only even-numbered pages, and causes BSE1 to have only odd-numbered pages. This manner of interleaving also causes BSM0 in each BSE to have only even-numbered blocks and BSM1 in each BSE to have only odd-numbered blocks.

The physical assignment of absolute addresses to BSE0 and BSE1 shown in TABLE 1 may also be represented in another form in TABLE 2 by means of byte ranges, in which each statement of a four MB (megabyte) byte range in TABLE 2 includes only every fourth block in the stated range with the block numbers being staggered in the sequence of the same four range statements for the different BSMs.

TABLE 2

| BSE0 (EVEN 4K pages) | | BSE1 (ODD 4K Pages) | |
|---|---|---|---|
| BSM0 | BSM1 | BSM0 | BSM1 |
| 0 to 4MB | 0 to 4MB | 0 to 4MB | 0 to 4MB |
| 4 to 8MB | 4 to 8MB | 4 to 8MB | 4 to 8MB |
| 8 to 12MB | 8 to 12MB | 8 to 12MB | 8 to 12MB |
| 12 to 16MB | 12 to 16MB | 12 to 16MB | 12 to 16MB |

The same interleaving technique in TABLE 1 also may be applied to BSE3 and BSE4 by assigning them the absolute addresses from 16 MB to 32 MB. This results in the block and page mapping shown in TABLE 3.

TABLE 3

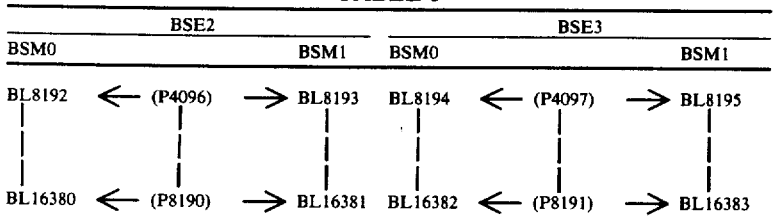

Each storage request from a processor or channel controller is inputted to the KIS means in both SCs while the absolute address of the request is in the XIR of one SC. The KIS means finds the key-in-storage for the addressed block in one of the SP arrays and checks its access code against the PSW protection key. If they do not match, the access may be prohibited, and a protection interrupt may be generated and sent to the requesting processor or channel controller.

The KIS means in each SC need not contain the key-in-storage bytes for the entire main storage. In this embodiment, the KIS means in one SC has a maximum number of the key-in-storage entries for servicing 24 MB of main storage, while the main storage size is 32 MB. In this embodiment, 16 MB of main storage in BSE0 and BSE1 are serviced by the KIS means in SC-0, and the remaining 16 MB of main storage in BSE2 and BSE3 are serviced by the KIS means in SC-1. Hence, only part of the KIS array in each SC (i.e. for 16 MB of storage) is used in each SC. The remaining unused part of each KIS array is spare capacity which may be used for replacement of any other part of the KIS array which may fail. Also, the total 24 MB capacity of the KIS means in one SC may be used to support 24 MB of main storage and 8 MB capacity of the KIS means in the other SC may support the remaining 8 MB of main storage.

Further, if the system is reconfigured to eliminate one SC, the KIS means in the remaining SC can support up to 24 MB of main storage in a single SC system. Thus, if on routine system maintenance, or component failure, one of the SCs is removed from the system operation, the remaining operating SC may have its KIS means reloaded to service 24 MB of main storage, e.g. SC-0 could operate alone, control and access BSE0, BSE1 and BSE2.

DESCRIPTION OF THE DETAILED EMBODIMENT

Figure 1A:
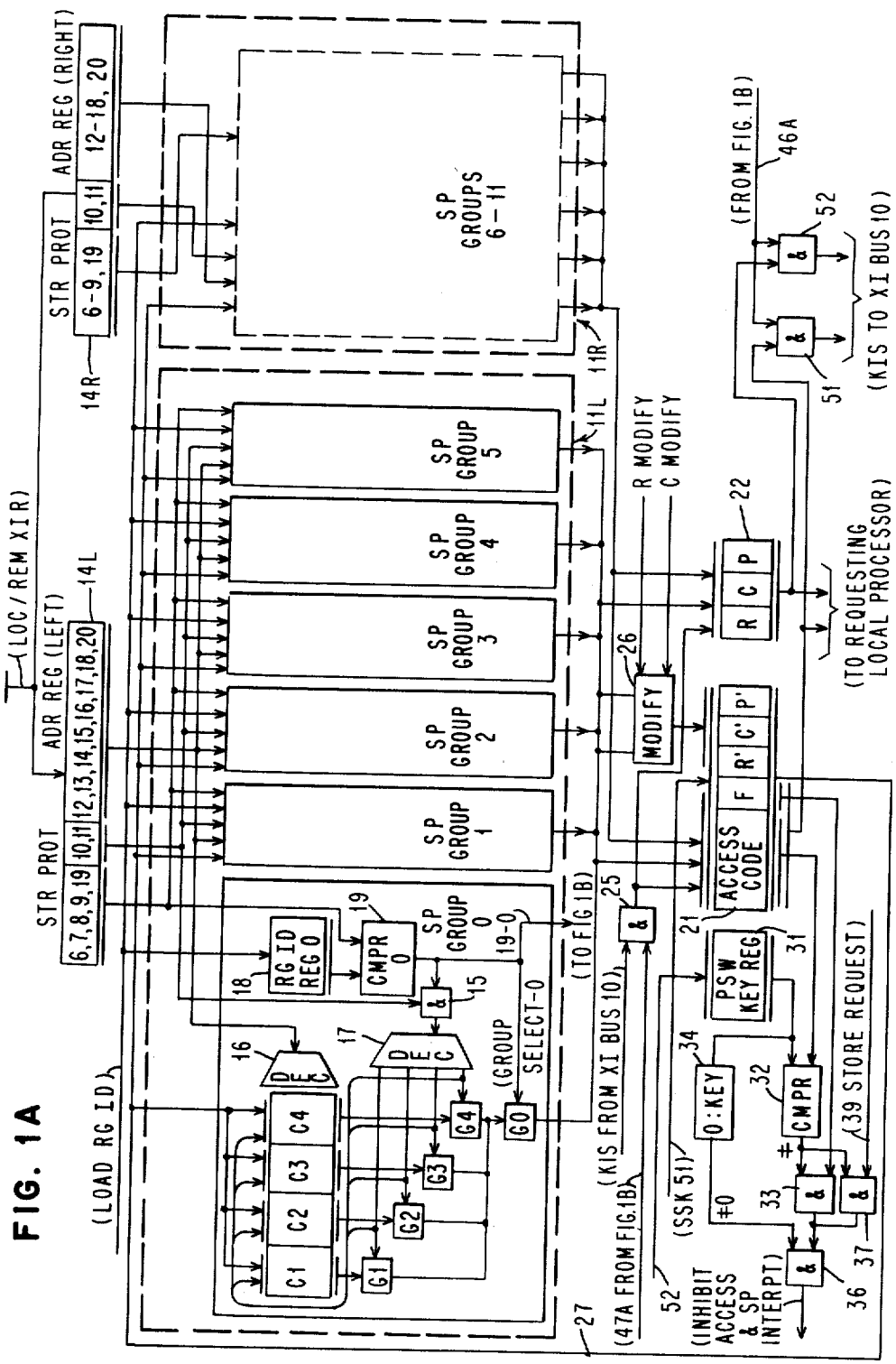
FIGS. 1A and 1B illustrate a detailed embodiment of the invention.
Figure 1B:
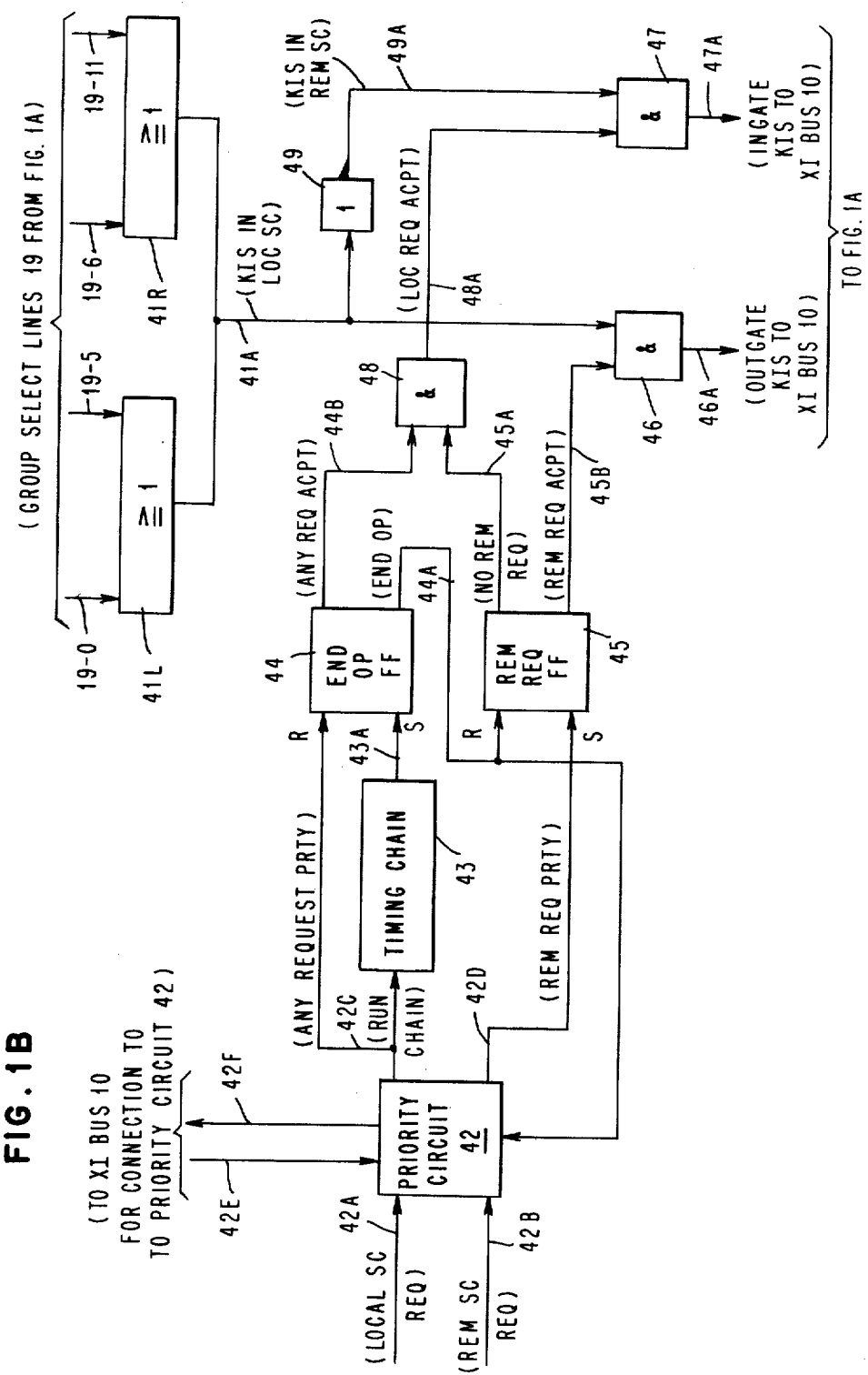

FIGS. 1A and 1B illustrate a preferred mode for a detailed embodiment of the reconfigurable key-in-storage (KIS) means of this invention found in each SC in FIG. 2. It includes a key-in-storage array comprised of twelve SP (storage product) groups 0-11 divided into a left half 11L comprised of groups 0-5 and a right half 11R comprised of groups 6-11. The reason for separate left and right halves is due to packaging within module constraints.

The hardware is identical within each of the SP groups 0-11. Each SP group includes four storage chips C1, C2, C3 and C4 which are shown in detail in SP group 0 in FIG. 1A. Each chip stores 256 entries, each having 9 bit positions. Each entry can receive one key-in-storage and its parity bit. Thus, each SP group has 1024 key-in-storage entries for the same number of 2 KB blocks. Therefore, each SP group can service 2 MB of main storage.

Each array half 11L and 11R is addressed respectively by a separate storage protect address register 14L and 14R, which are duplicated because of internal power and timing restraints due to the circuit technology used.

A decoder (DEC) 16 in each SP group is connected to a low-order field of eight bits 12–18, 20 in the respective SP address register 14L or 14R. The bit numbers shown in registers 14L and 14R identify bit positions in the absolute address of the current storage request being inputted to the reconfigurable key-in-storage means. The inputted absolute address is provided from a local or remote cross-interrogate register (XIR).

Decoder 16 decodes the received eight bits of the low-order field to select one of the 256 key-in-storage entries in each of the four chips C1–C4. Hence, four key-in-storage entries are located at one time. Only one of the located entries on one of the four chips is selected by the output of a second decoder 17, which has its input connected to an intermediate field in register 14L and 14R containing bit positions 10 and 11 from the absolute address. Decoder 17 decodes the two bits 10 and 11 to enable one of the four gates G1, G2, G3 or G4 to select one of the four selected keys-in-storage as an input to a group select gate G0. It is only when gate G0 is activated that its inputted key-in-storage byte will be outputted to an array output register 21 and a flag register 22.

Only one SP group in groups 0–11 can output the selected key-in-storage. That group is selected by the high-order field in register 14L or 14R comprised of bit positions 6–9, 19 from the absolute address of the current request.

Figure 3:
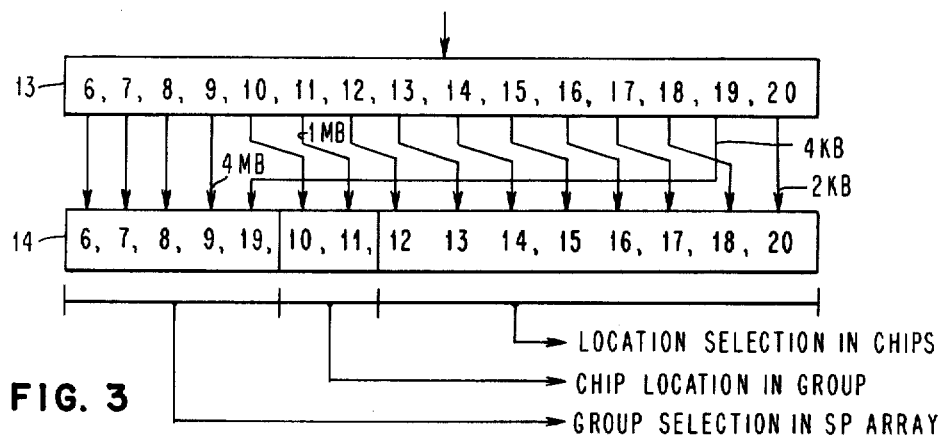
FIG. 3 shows the form of an address used to locate a key-in-storage in the embodiment in FIG. 1A, and the derivation of the bits of the address from the storage request.
Figure 4:
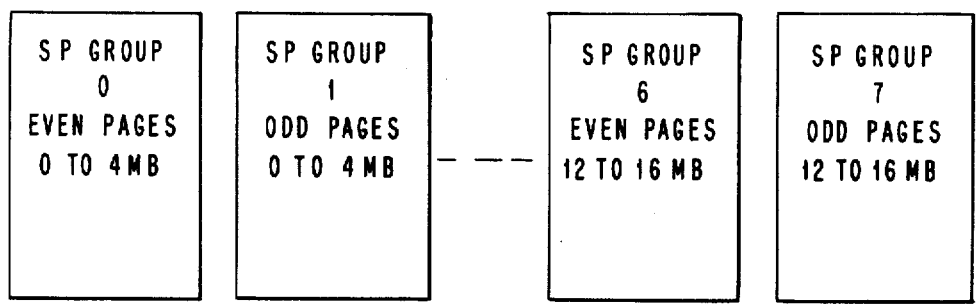
FIG. 4 is an example of the distribution in the SP array of keys-in-storage for even and odd numbered pages in an interleaved main storage when bit 19 interleaving is used in addressing the SP array.
Figure 5:
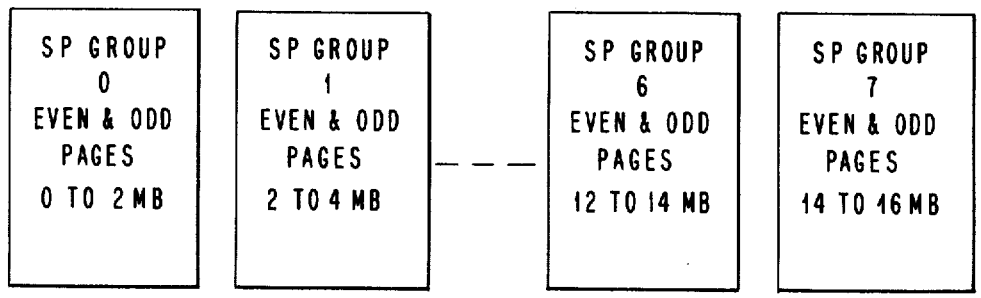
FIG. 5 represents the distribution in the SP array of keys-in-storage for even and odd numbered pages in an interleaved main storage when no interleaving is used in addressing the SP array.

FIG. 3 shows the relationship between the bit positions in the current request's absolute address in XI register 13 and the corresponding bit positions in each SP address register 14. Bit position 19 in the absolute address switches on page boundaries in main storage. A 4 KB page boundary occurs on every second 2 KB block boundary in main storage. In register 14, this bit position 19 adjacently follows bit position 9 which switches on 4 MB boundaries in main storage. Note that 4 MB is the size of each BSM in main storage.

The SP group selection is done on an associative basis by the assignment of a five bit value in a range identifier (RG ID) register 18. The preferred arrangement of the SP groups is to assign two SP groups to each 4 MB range of main storage. This is done by assigning the high-order four bit positions in register 18 with a value corresponding to bit positions 6, 7, 8 and 9 in each absolute address in the required range, in which bit 9 changes on 4 MB storage boundaries. Due to the associative nature of the SP groups, any two groups among the twelve groups may be assigned as a pair to the same 4 MB range. Each assigned pair of SP groups have the same high-order four bit value in their registers 18, but their low-order fifth bit in register 18 is set to 0 for one SP group, and is set to 1 for the other SP group in the pair. The result is that within the same 4 MB range, each even page has its two keys-in-storage mapped into the SP group for which its register 18 bit five is zero, and each odd page has its two keys-in-storage mapped into the other SP group for which its register 18 bit five is 1.

It makes no difference which, or in what order, the physical SP groups are assigned or paired since all SP groups are operated associatively in parallel with regard to the current request address in XIR 13.

The following TABLE 4 illustrates an example of how each key-in-storage (K) may be mapped into the twelve SP groups of an SP array and how each pair of keys-in-storage is associated with a 4 K page (P) in main storage. Each number prefixed with K is the block number in main storage with which this key is associated, and each number prefixed with P is a page number.

| (assigned to BSE0 - EVEN Pages) SP Group 0 | | (assigned to BSE1 - ODD Pages) SP Group 1 | | (assigned to BSE1 - ODD Pages) SP Group 7 | |
|---|---|---|---|---|---|
| C0 ———— C3 | | C0 ———— C3 | | C0 ———— C3 | |
| P0 { K0 / K1 | | P1 { K2 / K3 | | | |
| P2 { K1 / K5 | | P3 { K3 / K7 | | | |
| P4 { K8 / K9 | | P5 { K10 / K11 | | | |
| P5 { K12 / K13 | | P7 { K14 / K15 | | | |
| ⋮ | | ⋮ | | | |
| P254 { K508 / K509 | P1022 { K2044 / K2045 | P255 { K510 / K511 | P1023 { K2046 / K2047 | P4095 { K8190 / K8191 | |

Comparators 19 in the SP groups associatively select one of the twelve groups 0–11 in response to the value of bits 6–9, 19 in registers 14L and 14R for a particular request. All comparators 19 compare the assigned RG ID values in their registers 18 to the same high-order field (bits 6–9, 19) in SP protect registers 14L and 14R. Not more than one of the comparators 19 may detect equality between the high-order field in the address register and the range identifier value in its register 18 and provide a group select output signal. Thus, bit 19 in any absolute address which falls into a particular 4 MB range will select the one group of a pair which has its fifth bit equal to absolute address bit 19.

The group select output signal from comparator 19 activates its gate 15 to enable decoder 17 and enables gate G0 to cause the key-in-storage selected by one of gates G1-G4 to be outputted to array output register 21. The last three bits in the outputted key-in-storage byte (R, C and P) pass through a modify circuit 26, and they may be modified before they reach the respective bit positions R', C', P' in register 21. P is the parity bit for the selected key-in-storage byte. The unmodified bits R, C, P are inputted into flag register 22.

Modify circuit 26 operates in the conventional manner to modify the R', C' and P' values in register 21 in accordance with The System/370 Principles of Operation (previously cited). Modify circuit 26 is not novel herein and is found in commercial machines. It sets the R' bit to 1 state whenever the request command activates an R modify input line to modify circuit 26 which occurs for each fetch and store operation. The C' bit is also set to 1 state whenever the request command activates a C modify line to circuit 26 which occurs when the request is for a store operation in main storage. Whenever the R' or C' bit is changed, the parity bit P' is also updated within modify circuit 26.

Each time a value is inputted into array output register 21, its content is outputted on line 27 back to the currently addressed location in one of array chips C1, C2, C3 or C4 during enablement of gate 15 by the group select signal from comparator 19, so that the updated value of the key-in-storage byte is always available in the array for the next request.

The values of R, C and P in flag register 22 reflect those values existing when the current request was made. Register 22 along with the access code and bit F in register 21 are outputted to the processor originating the current access request, so that the processor can use this information as it existed when the request was made. If the request is from a local processor, the accessed KIS byte is directly forwarded to the local processor by the SC which accessed the KIS byte. If the request is from a remote processor, the locally accessed KIS byte is inputted to XI Bus 10 which sends it to the remote SC for the remote processor. If a remote request is not found in the local SC, the local SC has no further interest in the request. The local/remote control is explained below in more detail in regard to FIG. 1B.

FIG. 1B shows a coordination circuit with each KIS means for coordinating the local and remote transfer of KIS information between the two SCs, SC-0 and SC-1 for each SP operation shared between the two KIS means, in which one KIS means accesses the KIS byte and the other KIS means uses the accessed KIS bytes to perform a required operation. The two KIS means are connected by the cross-interrogation (XI) bus 10 in FIG. 2. All main storage requests in the system are simultaneously provided to both SC-0 and SC-1. A priority circuit 42 in FIG. 1B controls each SC to alternately give priority to local and remote main storage requests made to both SCs. As long as SC-0 and SC-1 requests are simultaneously contending in each SC, the sequence of request priority will be: SC-0, SC-1, SC-0, SC-1, etc. Both SCs can accept another request every fourth machine cycle if there is no synonym conflict. However, if only one SC is providing requests over a given time without contention from the other SC, then that SC can have its requests accepted every fourth machine cycle until a request is provided from the other SC. During contention, each SC accepts local requests every eighth machine cycles. Lines 42E and 42F connect between the priority circuits in SC-0 and SC-1 via bus 10 to synchronize their operation to the same request at the same time.

In FIG. 1B, local requests are provided from the CPs, channel controller processor and console processor connected directly to the SC. Remote requests are received on cross-interrogate bus 10 in FIG. 2 from the remote SC whenever the remote SC receives a request from any of the processors connected to the remote SC. Within each SC, both local and remote requests are provided on lines 42A and 42B, respectively, to priority circuit 42 which is a conventional type of circuit that determines that contending local and remote requests will alternately be given priority. An example of a prior alternating priority circuit is found in the IBM System/370 M168 multiprocessor systems, which have been on sale since 1973.

The priority output line 42C is activated whenever any local or remote request is given priority by circuit 42. When activated, line 42C starts a four cycle timing chain 43. Line 42D is activated only when a remote request is given priority by circuit 42. The timing chain 43 times out a period during which the request currently given priority is checked for similar entries in all directories DIR in SC-0 and SC-1, and its storage protection is checked in the KIS means in SC-0 or SC-1. If the request is found acceptable, it is entered in its processor's SC directory, and it is put in the request queue Q of the local SC to await access in main storage.

An end operation trigger 44 is reset by an any request priority signal on line 42C. Trigger 44 is set by a timeout signal on line 43A from chain 43 to indicate an end of the SC preprocessing operation for the current priority request. A line 44A connects the end operation output of trigger 44 back to priority circuit 42 so that it can be reset to make its next priority decision. Line 44A also resets a remote request trigger 45, which is set only when priority circuit 42 gives priority to a remote request.

The existence of a local request is detected by an AND circuit 48 when it activates an output line 48A. To do this, circuit 48 receives the no remote request line 45A from trigger 45 and the any request accepted line 44B from trigger 44.

OR circuits 41L and 41R in each KIS means indicate whether the key-in-storage byte for a current request (local or remote) has or has not been found in the local KIS means by the state of a signal on line 41A. OR circuits 41L and 41R have inputs connected to the twelve group select lines 19-0 to 19-11 from every comparator 19 in FIG. 1A. Therefore, if any comparator 19 is activated for the array, line 41A will be activated to indicate a KIS byte was found.

An AND gate 46 provides an output on line 46A when the KIS byte found in a local KIS means has been found for a remote request. Inputs to gate 46 are received from line 41A (indicating when a KIS is found in the local array) and to line 45B (indicating when the current priority request is a remote request). The output 46A of gate 46 is connected to AND gates 51 and 52 in FIG. 1A to outgate to cross-interrogate (XI) bus 10 in FIG. 2. A KIS byte comprising the access code and F bit in register 21 and the flags R, C and P in register 22.

In FIG. 1B, an AND gate 47 indicates when the KIS byte for a local request has not been found in the local KIS array and must be obtained from the KIS array in the remote SC which provides the KIS byte on XI bus 10. Line 41A indicates when no key-in-storage byte was found in the KIS means by providing a down state output. Then it is presumed that the key-in-storage byte was found in the KIS means in the remote SC and is available from XI bus 10. An inverter 49 inverts the down state on line 41A to provide an up state on a line 49A indicating the KIS byte for the current request (local or remote) is found in the remote SC and is available from bus 10. AND gate 47 is conditioned by line 49A and by line 48A indicating the current priority request is from a local processor. The output 47A of gate 47 conditions an AND gate 25 in FIG. 1A to cause it to ingate the KIS byte from XI bus 10, in which the access code and F bit are ingated into register 21 and the R, C and P bits are ingated into register 22 and into modify circuit 26 which outputs bits R', C', P' into register 21. However, the remotely derived content of register 21 is not outputted on line 27 for storage into the SP array, as would be done for a local group having its group select line 19 actuating the AND gate 15. The values in registers 21 and 22 are then available to the requesting local processor from the provided outputs of registers 21 and 22.

If the current priority request is a remote request and its KIS byte was found in the remote KIS means, then neither gate 46A nor 47A will be activated and the entire KIS operation will be handled in the remote KIS means.

Thus, the circuit in FIG. 1B permits the KIS operation for any local request to be shared between the two KIS means in SC-0 and SC-1 by permitting the remote KIS means to access the KIS byte and the local KIS means to check the storage protection and flag bytes for the local request.

With each storage request command, a PSW key is received in a register 31. A circuit 34 detects when the PSW key is not zero to provide a non-zero key output that conditions an access inhibiting AND circuit 36. If the PSW key is zero, the current request can access main storage regardless of the values in the key-in-storage byte in register 21. Thus, a zero PSW key prevents an output from non-zero detection circuit 34, which deactivates AND circuit 36 so that the access cannot be inhibited by the SP circuits and no SP interrupt can be caused.

A comparator 32 compares the PSW key to the access code in register 21 for all requests. Comparator 32 provides an output when its input key codes are unequal to condition AND circuits 33 and 37. AND circuit 33 also is conditioned by the F bit being set in register 21, so that AND gate 33 is enabled by the F bit set state during a key mismatch to output an inhibiting signal through circuit 36 for a non-zero key; and no main storage access may be done for the request, and a SP violation interrupt is signalled to the requesting processor.

A store request signal on a line 39 is provided with each request command for a store operation. The store request signal conditions AND circuit 37, which is also conditioned by an unequal key output from comparator 32, so that AND circuit 37 provides an access inhibiting and processor interrupting output via circuit 36 for non-zero keys for a store request during a key mismatch.

Not all instructions which output a key-in-storage byte from the array in FIG. 1A will access main storage. For example, if a central processor executes an insert storage key instruction, the specified KIS entry location in one of the array groups is outputted to register 21, from which it is sent to the processor for insertion into a general purpose register designated by the instruction. No modification is done in modify circuit 26. Main storage is not accessed.

Similarly, a System/370 reset reference bit instruction operates to read out the specified key-in-storage byte from an SP group into register 21, and then modify circuit 26 resets the R' bit in register 21 after which the content of register 21 is stored into the specified location in the selected SP group. Main storage is not accessed.

Also a set storage key instruction causes the key-in-storage field in the general purpose register specified in the instruction to be transferred on SSK bus 51 in FIG. 1A into array register 21, and then register 21 is outputted into the array at the location specified by the block address in the other general purpose register specified in the instruction.

While the invention has been particularly shown and described with references to preferred embodiments thereof, it will be understood by those skilled in the art that the foregoing and other changes in form and details may be made therein without departing from the spirit and scope of the invention.

Having thus described our invention, what we claim as new and desire to secure by Letters Patent is:

1. Reconfigurable storage protection (SP) array control means for a main storage having BSMs (basic storage modules) organizable on a plural BSM interleaved basis, a storage request register receiving the absolute address of each storage request, means for testing each SP key for determining the permissability of each access request to main storage, and prohibiting a requested main storage access when the key is violated, comprising:

a plurality of SP groups comprising the SP array, each group having at least one array chip, at least one SP address register for receiving bits of each absolute address in the storage request register, the absolute address having: a BSM bit position which switches at main storage boundaries equal to the size of a BSM, and a block-related bit position which switches at main storage boundaries equal to an integral multiple of the size of a block, means connecting the bit positions of the absolute address in the storage request register to corresponding bit positions in the SP address register in the absolute address sequence of bits except that the block-related bit position is connected out-of-sequence to adjacently follow the BSM bit position in the SP address register, the SP address register being divided into at least a high-order field and a low-order field, the high-order field having both the BSM bit position and the block-related bit position, decoder means in each SP group having an input connected to the low-order field of the SP address register, the decoder output connected to the array chip in the same SP group for locating an SP entry in the group, a range identifier register in each SP group containing a value defining a range related to the size of a BSM, a comparator in each SP group having one input connected to the high-order field in the SP address register, another input to the comparator connected to the range identifier register in the same SP group to select a required one of the SP groups in response to a storage request, gating means with each SP group connected to the output of the comparator and to the output of the chip in the same SP group for outputting the SP entry located by the decoder means required by the storage request, array output registering means, and means for connecting the gating means of all SP groups in the array to the input to the array output registering means to output a selected SP entry.

2. Reconfigurable storage protection array control means, as defined in claim 1, in which:

each SP group further comprises a plurality of array chips, the gating means further comprises a chip output gate for each chip, an intermediate field is formed in the SP address register between the high-order field and the low-order field, the decoder means comprises a chip decoder connected to the intermediate field for selecting a particular chip output gate, and a location decoder connected to the low-order field for locating an entry in the chip connected to the particular chip output gate, and the gating means outputting the selected chip output gate to the array output registering means only in response to an output from the comparator.

3. Reconfigurable SP array control means as defined in claim 1, in which:

a processor console loads a different BSM range value into range identifier register, and whereby the SP groups in the SP array operate associatively in relation to the requests.

4. Storage protect (SP) hardware having a plurality of SP entries for operating with main storage request addresses, in which each SP entry contains a protect key for a main storage block, main storage being organized with a plurality of modules providing a sequence of absolute addresses, and means for accessing main storage for data at a required storage request address, means for testing each SP key for determining the permissability of each access request to main storage, and prohibiting the requested main storage access when the SP key is violated, the SP hardware comprising:

a plurality of SP array groups for containing the SP entries,

SP register means for receiving each required storage request address being provided to main storage, an address range register being provided in each array group for relating the SP arrays to an assignment of absolute addresses in the respective modules of main storage, comparator means in each array group having one input for receiving a high-order part of the storage request address to main storage and having another input being connected to the address range register in the respective SP array group to select the associated SP array group upon an equal comparison, decoder means with each array group for receiving a remaining low-order part of the storage request address to locate a SP entry in the selected array group at the same time that the storage request address is having requested data accessed in a requested module in main storage by the accessing means, whereby a flexible hardware relationship is obtained between the SP hardware and hardware entities comprising main storage.

5. SP hardware for operating with main storage request addresses as defined in claim 4, further comprising:

each SP array group having a store array with a plurality of rows of SP entries arranged into a plurality of columns, the decoder means selecting a SP entry in the store array by two dimensional selection by separating the low-order part of the storage request address into an upper section and a lower section which respectively address a column and row in the store array, whereby any SP array group can be assigned to protect the accessing of data in any of plural subsets of contiguous addresses in main storage by loading a subset address into the address range register in the SP array group.

6. SP hardware for operating with main storage request addresses as defined in claim 5, the decoding means for each SP array group further comprising:

a first decoder receiving the lower section of the low-order part of the storage request address to select a row of SP entries in the store array of a selected array group, a second decoder receiving the upper section of the low-order part of the storage request address to select the column and thereby a required SP entry in the selected row in the store array.

* * * * *